United States Patent [19]
Elias

[11] Patent Number: 5,928,807
[45] Date of Patent: *Jul. 27, 1999

[54] INTEGRATED SEAL FOR A PEM FUEL CELL

[75] Inventor: Hartmut Elias, Meersburg, Germany

[73] Assignee: Ballard Power Systems Inc., Burnaby, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,096

[22] Filed: Nov. 15, 1996

[30] Foreign Application Priority Data

Nov. 15, 1995 [DE] Germany .................. 195 42 475

[51] Int. Cl.$^6$ ......................................... H01M 8/02
[52] U.S. Cl. ................................. 429/35; 429/38
[58] Field of Search ................. 429/35, 36, 38, 429/39, 30, 33; 29/623.1

[56] References Cited

U.S. PATENT DOCUMENTS

| | | |
|---|---|---|
| 4,751,153 | 6/1988 | Roth .......................... 429/35 |
| 5,284,718 | 2/1994 | Chow et al. . |
| 5,292,600 | 3/1994 | Kaufman . |
| 5,514,487 | 5/1996 | Washington et al. ............ 429/39 |

FOREIGN PATENT DOCUMENTS

| | | |
|---|---|---|
| 3526614 C2 | 1/1986 | Germany . |
| 4314745 C1 | 12/1994 | Germany . |
| 4442285C1 | 2/1996 | Germany . |
| 19539959A1 | 5/1996 | Germany . |
| 60-065781 | 4/1985 | Japan . |
| 61-007570 | 1/1986 | Japan . |
| 61-007571 | 1/1986 | Japan . |
| 1-296569 | 11/1989 | Japan . |
| 4012465 | 1/1992 | Japan . |
| 5-234606 | 10/1993 | Japan . |
| 08045517 | 2/1996 | Japan . |
| PCT/EP94/02181 | 2/1995 | WIPO . |
| PCT/CA94/00673 | 6/1995 | WIPO . |
| PCT/US95/13325 | 4/1996 | WIPO . |

*Primary Examiner*—Anthony Skapars
*Attorney, Agent, or Firm*—McAndrews, Held & Malloy, Ltd.

[57] ABSTRACT

The invention provides a polymer electrolyte fuel cell with distributor plates which are made of an elastic, plastically deformable material, particularly of graphite foil, and which have integrated gas or liquid ducts. In order to seal off the gas or liquid spaces with respect to one another in a simple and reasonably priced manner, elevated portions are integrated in the distributor plates made of an elastic, plastically deformable material. The distributor plates with an integrated seal can be produced by stamping using a stamping tool having corresponding elevations for forming the gas or liquid ducts and corresponding indentations for forming the sealing arrangement.

3 Claims, 2 Drawing Sheets

INTEGRATED SEAL FOR A PEM FUEL CELL

BACKGROUND AND SUMMARY OF THE INVENTION

This invention relates to a polymer electrolyte membrane fuel cell having distributor plates made of an elastic, plastically deformable and electrically conductive material.

In the simplest case, fuel cells consist of two electrically conductive electrodes which are separated from one another by an ion-conducting membrane. For feeding the reaction media, distributor plates having integrated gas or liquid feeding ducts are used. In order to prevent an uncontrolled escape of the reaction media, the individual gas or liquid spaces in the case of conventional fuel cells are sealed off with respect to one another by means of seals which are each arranged between the distributor plates and the electrodes.

In the case of fuel cells with proton-conducting polymer electrolyte membrane (so-called PEM fuel cells), the distributor plates are made of graphite materials, and seals made of an elastomer material are entered into the porous electrodes of the membrane electrode arrangement which consist of carbon paper. For the distributor plates, elastic, plastically deformable and electrically conductive materials can preferably be used, particularly graphite foils with a specific density of 0.2–1.8 $g/cm^3$. Such an arrangement is shown, for example, in U.S. Pat. No. 5,284,718.

Since the distributor plates and elastomer seals are made of different materials, they have different thermomechanical characteristics. Thus, during the operation of the PEM fuel cell, leakages can occur as a result of the heating of the fuel cell because of the different expansion of the materials. In addition, considerable expenditures are required for the manufacture, mounting and precise adjustment of these seals.

In order to solve this problem, it was suggested in German Patent Document DE 43 14 745 C1 to manufacture all important components of the PEM fuel cell (and thus also the distributor plates) of a thermoplastic basic polymer, and to join them by means of a combining process without any additional sealing material. Although this method eliminates the need for separate elastomer seals, it considerably limits the selection of material for the fuel cell construction.

It is an object of the present invention to provide an effective and easily manufacturable sealing arrangement for polymer electrolyte membrane fuel cells having distributor plates made of an elastic, plastically deformable and electrically conductive material.

According to the invention, this object is achieved providing the seal in the form of an elevated portion which is integrated into the distributor plate itself. This arrangement offers various advantages. On the one hand, the thermomechanical characteristics of the sealing material and of the distributor plate are identical, and are thus not critical with respect to a heat expansion. In addition, the manufacture of the distributor plates and the construction of the seal can take place in a common fabrication process, which reduces the manufacturing costs. Finally, the expenditures for the mounting and precise adjustment of the seal are eliminated.

Other objects, advantages and novel features of the present invention will become apparent from the following detailed description of the invention when considered in conjunction with the accompanying drawings.

DETAILED DESCRIPTION OF THE DRAWINGS

Figure 1:
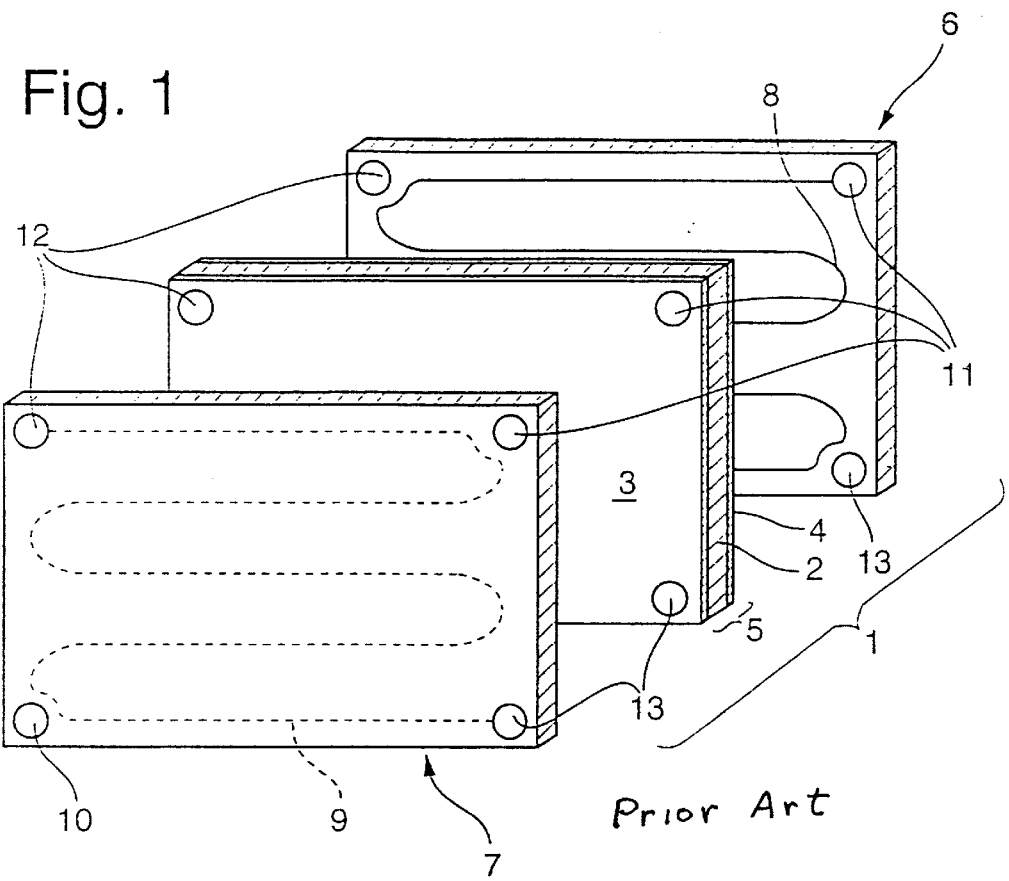
FIG. 1 shows the basic construction of an individual cell of a PEM fuel cell.

FIG. 1 illustrates an individual cell which, as a whole, has the reference number 1 and which is part of a fuel cell which is not shown in detail. This is a fuel cell with a polymer electrolyte membrane 2, referred to herein simply as a PEM fuel cell. The method of operation of a PEM fuel cell is well known (for example, from the indicated prior art) and will therefore be described only briefly in the following. In such PEM fuel cells, electric current is generated from hydrogen and oxygen. However, the reaction partners are not brought into a direct contact, but are reacted on the polymer electrolyte membrane 2 in a controlled electrochemical process. Water is obtained as the reaction product.

For the collection of the electric current, the polymer electrolyte membrane 2 is provided on opposite surfaces in each case with a conductive electrode layer 3, 4. To improve the reaction, in addition, a catalyst layer, preferably made of a platinum material, can be applied to the electrodes 3, 4. The arrangement of the polymer electrolyte membrane 2, the electrodes 3, 4 and the catalyst layer together forms the so-called membrane electrode arrangement 5. Distributor plates 6, 7 supply the reaction media to the membrane electrode arrangement 5. Ducts 8, 9 are formed on the surfaces of the distributor plates 6, 7 facing the membrane electrode arrangement 5, the ducts 9 assigned to the cathode 3 being used to supply oxygen or air and the ducts 8 assigned to the anode 4 being used to supply hydrogen or another fuel gas.

Particularly in the case of fuel cell stacks composed of many individual cells 1, openings 10–13 are provided to supply the reaction media to the individual distributor plates 6, 7 and the membrane electrode arrangement 5. The openings 10, 11 are used to supply and discharge hydrogen or another fuel gas, while the openings 12, 13 are used to supply and discharge oxygen or air. In the case of fuel cell stacks, cooling ducts can also be provided in the distributor plates 6, 7 or in separate cooling plates. However, for the sake of simplicity, these are not indicated in the drawing. In this case, so-called bipolar distributor plates are preferably used, which have ducts 9 for the oxygen or air on one surface, and ducts 8 for the hydrogen or another fuel gas on the opposite surface. The cooling ducts are integrated in the core of these bipolar plates.

Figure 2:
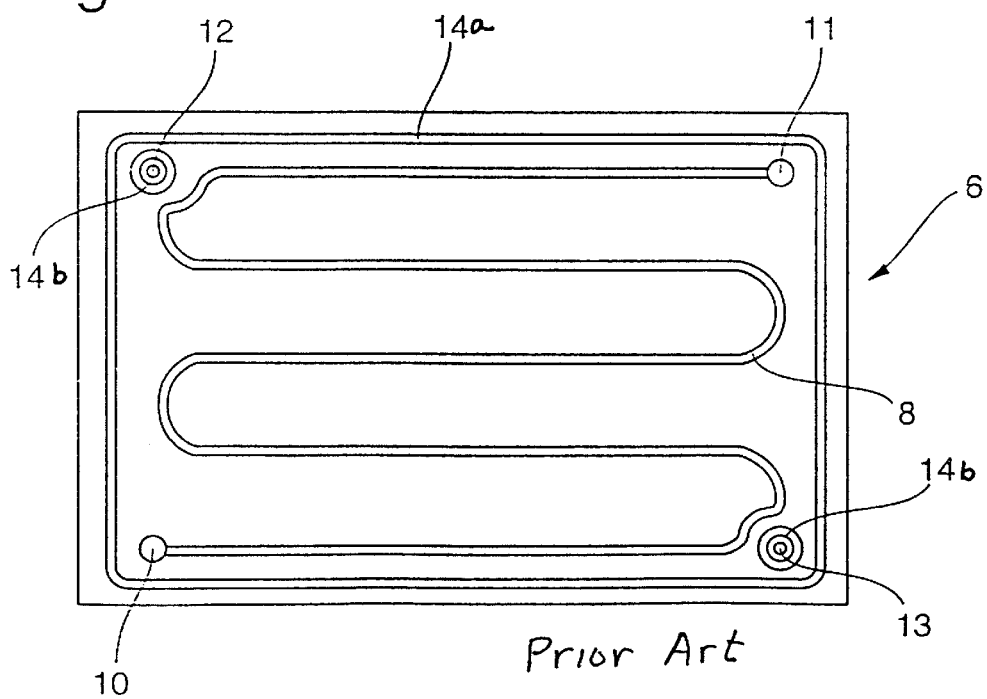
FIG. 2 is a view of the distributor plate from FIG. 1.

The construction of the distributor plates will now be described in detail by reference to FIG. 2 in which the distributor plate 6 from FIG. 1 is again shown completely. To supply hydrogen to the membrane electrode arrangement 5, the duct 8 is connected between the openings 10 and 11. Specifically, the hydrogen or another fuel gas is supplied by way of the opening 10, is distributed by means of the duct 8 over the whole surface of the membrane electrode arrangement 5, and is finally discharged by way of the opening 11. In a fuel cell stack, the gases flow serially through the openings 10–13; in each case, partial flows are taken from the supplies 10, 12 at each plate, and delivered to the discharge 11, 13. To prevent the escape of the hydrogen or other fuel gas, a seal 14a is provided along the exterior edge of the distributor plate 6. When the fuel cell is assembled, this seal 14a abuts and forms a gastight seal with the membrane electrode arrangement 5, so that a hydrogen space is formed between the membrane electrode arrangement 5 and the distributor plate 6, which hydrogen space extends along the whole membrane surface. In order to prevent flow of oxygen or air out of the openings 12, 13 into the hydrogen space, circular seals 14b are also provided along these openings 12, 13.

Conventionally the seals 14a, 14b are provided by forming a corresponding recess in the electrode of the membrane electrode arrangement 5. A sealing foil (preferably made of an elastomer material) is then placed in the recess, or a corresponding sealing mass in a different form is entered. After the mounting, the seal rests against the pertaining distributor plate in a gastight manner. However, this type of a sealing arrangement has several disadvantages.

On the one hand, because of different thermomechanical characteristics, the seal 14 and the electrode may expand to different degrees in the event of a temperature change, so that leakages may occur during the operation of the fuel cell. Also, during the mounting of the fuel cell, an additional mounting step is required since either the sealing mass must be entered into the recess or the prefabricated sealing foil must be placed in the recess. In the latter case, the sealing foil must even be prefabricated in a separate manufacturing process. Finally, during the mounting, the seal must be aligned precisely with the electrode.

Figure 3:
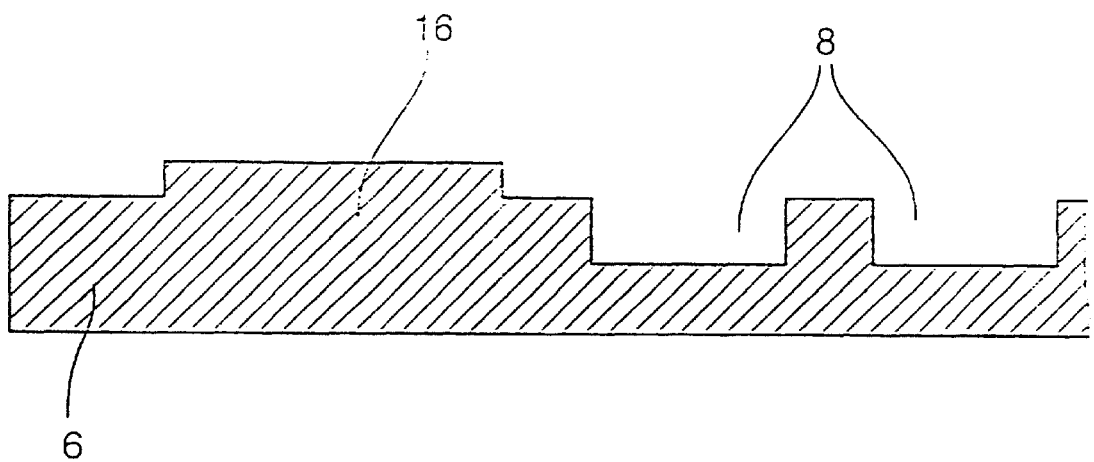
FIG. 3 is an enlarged schematic sectional view of a portion of a distributor plate with an integrated seal.

FIG. 3 shows an enlarged schematic cross sectional view of a portion of a distributor plate 6 which incorporates an integrated seal arrangement according to the invention. The arrangement illustrated in FIG. 3 avoids all of the above disadvantages. Instead of a separate seal 14a, 14b, an elevated portion 16 (hereinafter referred to simply as an "elevation") integrated in the distributor plate 6 is used as the seal. As determined in tests, this arrangement also permits a liquid-tight and gastight closure between the surface of the elevation 16 and the membrane electrode arrangement 5 under the conditions existing in a PEM fuel cell. For this purpose, only the elevation 16 integrated in the distributor plate need be arranged at the desired points during the manufacturing of the distributor plates 6, in place of the seals 14a, 14b in the prior art.

Since such distributor plates 6 preferably consist of an elastic and plastically deformable graphite material, and are manufactured of a starting material with a low specific density by means of compression or structuring processes, it necessary only to provide corresponding grooves of a suitable shape for forming the elevations 16 on the stamping tool in addition to the webs which are required for the shaping of the ducts 8. This means that, instead of the previous manufacturing and mounting operation, the present invention requires only that the stamping tool be modified. For this purpose, the desired elevations and duct structures are constructed on the stamping tool in an inverse arrangement. Although the embodiment shows a rectangular elevation 16, naturally other shapes can also be selected for the elevation 16. Also the position of the elevations 16 on the distributor plate 6 in FIG. 2 represents only a basic embodiment. The invention should therefore not be restricted to the illustrated embodiment.

Since, in the case of the arrangement according to the invention, the distributor plate 6 and the seal are made of the same material, and thus have identical thermomechanical characteristics, temperature changes of the system cannot cause difficulties due to a differing expansion behavior. Moreover, this arrangement also has advantages with respect to the manufacturing. Since the elevations 16 are formed during the stamping of the distributor plate 6, additional manufacturing operations and subsequent mounting, which are otherwise necessary, are eliminated.

Although the arrangement of the elevations 16 was described only by means of the distributor plate 6 for the hydrogen or fuel gas, such seal arrangements according to the invention can also be used in a corresponding manner for the distributor plate 7 for the oxygen or the air, and for other components, for example, separate cooling plates, in a fuel cell stack. In general terms, by means of the elevations 16 integrated in the foils made of an elastic, plastically deformable and electrically conductive material, arbitrary liquid or gas spaces between this foil and adjoining plates or foils can be sealed off. In particular, it is possible to seal off the liquid or gas spaces in the distributor plates 6, 7 with respect to other graphite surfaces. The feature of being electrically conductive and plastically deformable and nevertheless maintaining elastic properties is characteristic of the material used for the distributor plates 6, 7. An example of such a material is graphite foil with a density of 0.2–1.8 g/cm$^3$. The sealing arrangement according to the invention can naturally also be combined with the conventional sealing techniques so that elastomer seals and integrated elevations are used in a supplementing manner.

Should the elasticity of the distributor plate not be sufficient to ensure an adequate sealing between the distributor plate 6 and the membrane electrode arrangement 5 during the assembling of the fuel cell, in addition to the elevations 16, corresponding indentations which are provided with an elastomer seal can be provided on the membrane electrode arrangement 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A polymer electrolyte membrane fuel cell comprising:
   at least one membrane electrode assembly comprising a polymer electrolyte membrane provided on opposite sides with a conductive electrode layer;
   a pair of distributor plates arranged on opposite sides of said membrane electrode assembly, at least one of said distributor plates being made of elastic, plastically deformable and electrically conductive graphite foil having a density from 0.2 to 1.8 g/cm$^3$, and having integrated ducts for supply or discharge of reaction or cooling media;
   a liquid tight and gas tight seal between the distributor plates and the membrane electrode assembly, for sealing of the individual gas or liquid spaces, said seal being formed by an elastic, plastically deformable and electrically conductive graphite elevated portion which is integrated in the distributor plate.

2. The fuel cell according to claim 1, wherein the distributor plate is sealed off by means of elevations in addition to other components of the polymer electrolyte membrane fuel cell.

3. The fuel cell according to claim 1, further comprising corresponding indentations on a plate opposite the distributor plate said indentations having a configuration which corresponds to that of the elevations.

\* \* \* \* \*